United States Patent
Suyama

(10) Patent No.: US 6,615,461 B2
(45) Date of Patent: Sep. 9, 2003

(54) TONGUE OF INFLATABLE BELT DEVICE

(75) Inventor: Yoji Suyama, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/064,360

(22) Filed: Jul. 5, 2002

(65) Prior Publication Data

US 2003/0005560 A1 Jan. 9, 2003

(30) Foreign Application Priority Data

Jul. 6, 2001 (JP) ......................................... 2001-206598

(51) Int. Cl.[7] .......................... A44B 11/25; B60R 21/18
(52) U.S. Cl. .............................. 24/633; 24/634; 24/647; 24/664; 280/732; 280/733; 280/743.1; 297/481; 297/468
(58) Field of Search ............................ 24/633, 634, 640, 24/647, 664; 280/732, 733, 743.1; 297/481, 468, 471, 472

(56) References Cited

U.S. PATENT DOCUMENTS

| | | | | |
|---|---|---|---|---|
| 2,863,200 A | * | 12/1958 | Miller et al. ................... | 24/633 |
| 3,791,670 A | * | 2/1974 | Lucore et al. ........ | 280/150 AB |
| 3,874,694 A | * | 4/1975 | Stephenson ........... | 280/150 AB |
| 3,877,719 A | * | 4/1975 | Lewis et al. .......... | 280/150 AB |
| 5,218,744 A | * | 6/1993 | Saito ............................. | 24/633 |
| 5,303,953 A | * | 4/1994 | Kamiyama et al. .......... | 280/733 |
| 5,346,250 A | * | 9/1994 | Kamiyama ................... | 280/733 |
| 5,466,002 A | * | 11/1995 | Tanaka et al. ............... | 280/733 |
| 6,168,196 B1 | | 1/2001 | Nariyasu | |
| 6,244,621 B1 | * | 6/2001 | Kameyoshi et al. ......... | 280/733 |
| 6,276,715 B1 | * | 8/2001 | Takeuchi ..................... | 280/733 |
| 6,419,264 B1 | * | 7/2002 | Tsuji et al. .................. | 280/733 |

FOREIGN PATENT DOCUMENTS

| | | |
|---|---|---|
| JP | 11-334513 | 12/1999 |
| JP | 2000-185623 | 7/2000 |
| JP | 2000255358 | 9/2000 |

* cited by examiner

Primary Examiner—Victor Sakran
(74) Attorney, Agent, or Firm—Foley & Lardner

(57) ABSTRACT

A tongue of an inflatable belt device which allows a lap belt anchor to be easily assembled to a tongue body is provided. A tongue plate is provided on its one surface with hook-like projections for coupling a lap belt anchor to the tongue plate, and stoppers for preventing the lap belt anchor engaged with the projections from coming off the projections. Each stopper is supported by a plate spring. As receiving holes are engaged with the projections, the stoppers come in contact with the front end face of the lap belt anchor.

9 Claims, 13 Drawing Sheets

(a)

(b)

(a)

(b)

TONGUE OF INFLATABLE BELT DEVICE

BACKGROUND

The present invention relates to a tongue of an inflatable belt device for protecting an occupant of a vehicle such as an automobile in the event of a vehicle collision. More particularly, the present invention relates to a tongue to which a shoulder belt and a lap belt are both connected.

As an example of this type of inflatable belt device, there is a device disclosed in Japanese Patent Unexamined Publication No. H5-85301 (incorporated by reference herein). FIG. 13 is a perspective view of an inflatable belt device disclosed in the publication.

As shown in FIG. 13, the inflatable belt device 120 comprises an inflatable belt 122 configured as a shoulder belt extending diagonally from the right side to the left side of a vehicle occupant. The device also includes a webbing 122a connected to the inflatable belt 122, a lap belt 123 extending from the right side to the left side of the occupant, and a buckle 124 fixed to, for example, a vehicle floor. A tongue 125 to be inserted into and latched with the buckle 124 when the occupant wears the inflatable belt is also provided. An intermediate guide 126 is provided for guiding the webbing 122a.

The webbing 122a is a normal webbing which is the same as a typical conventional seat belt and is slidably hung by the intermediate guide 126. The end of the webbing 122a is connected to a seat belt retractor (ELR) 127, which has an emergency locking mechanism and is fixed to the vehicle body.

One end of the inflatable belt 122 is connected to the webbing 122a by sewing or the like and the other end of the inflatable belt 122 is connected to the tongue 125.

The lap belt 123 is a normal webbing which is the same as a typical conventional seat belt and of which one end is connected to the tongue 125 and the other end is connected to a seat belt retractor (ELR) 128, which is fixed to the vehicle body. A gas generator 129, which is actuated to generate high pressure gas in emergency situations, e.g., a collision, is connected to the buckle 124.

The tongue 125 and the buckle 124 have passages allowing gas from the gas generator 129 to flow into the inflatable belt 122.

The inflatable belt 122 comprises a bag formed in a long envelope shape having a large width and a cover. The bag is folded into a band-like shape having a small width and is covered by the cover. In the normal state, the bag is held in the band-like shape. The inflatable belt device 120 can be used in the same manner as the normal seat belt device. As the gas generator 129 is actuated in the event of a vehicle collision, the inflatable belt 122 is inflated, thereby protecting the vehicle occupant.

An example of structure for connecting the lap belt to the tongue is disclosed in Japanese Patent Unexamined Publication No. H11-334513 (incorporated by reference herein). In particular, FIG. 5 of the publication shows the structure. This structure is configured so that a lap belt anchor is attached to a tongue plate and a lap belt is connected to the lap belt anchor. The lap belt anchor is provided with an opening through which the lap belt is inserted. After an end portion of the lap belt is inserted into the opening, the lap belt is folded double along an edge of the opening so that the end portion is superposed on a portion of the lap belt following the end portion. The superposed portions of the lap belt are sewn together by stitching.

In one example of structure of installing an inflatable belt device comprising a tongue, a shoulder belt, a lap belt, and a retractor to an automobile, the retractor is arranged inside a B-pillar and is covered by a pillar cover. The shoulder belt and the lap belt are passed through belt through holes of the pillar cover.

In the inflatable belt device in which the lap belt anchor attached to the tongue plate is connected to the lap belt by sewing just like the device disclosed in Japanese Patent Unexamined Publication No. H11-334513, the lap belt anchor is attached to the tongue plate and the lap belt is connected to the lap belt anchor in the manufacturing process of the inflatable belt device. In an inflatable belt device of this type and in the aforementioned installation structure in which the retractor is arranged inside a B-pillar, the shoulder belt and the lap belt are required to be previously passed through the belt through holes of the pillar cover before the assembly line of the automobile, because it is impossible to sew the lap belt by using a sewing machine during the assembly line of the automobile.

The inflatable belt device assembled to the pillar cover is bulky, thus increasing the cost for carrying it to the assembly line of the automobile.

SUMMARY OF THE INVENTION

Therefore, it is an object of the present invention to provide a tongue of an inflatable belt device which allows a lap belt anchor to be easily attached to a body of the tongue, whereby the inflatable belt device can be carried solely (that is, without being assembled with a vehicle interior cover such as a pillar cover) to the assembly line of an automobile.

According to one embodiment of the present invention, a tongue of an inflatable belt device is provided. The tongue includes a tongue body which can be latched with a buckle and to which a shoulder belt including an inflatable belt is connected. The tongue also includes a lap belt anchor to be coupled to the tongue body, and at least one insertion member of the tongue body for engaging the lap belt anchor. A stopper is disposed on the tongue body for preventing the lap belt anchor engaged with the insertion member from coming off the insertion member. The stopper can be elastically displaced or deformed from a prevention position where the stopper prevents the lap belt anchor from coming off the insertion member to an escape position where the stopper allows the lap belt anchor to be engaged with the insertion member.

According to the present invention, the tongue of the inflatable belt, the lap belt anchor may be coupled to the tongue body by engaging the lap belt anchor with the insertion member of the tongue body. As a result, the lap belt anchor and the tongue body may be separately carried to the assembly line of automobiles. After passing the shoulder belt and the lap belt with the lap belt anchor into openings of a pillar cover, the lap belt anchor can be coupled to the tongue body during assembly of the automobile. Therefore, the inflatable belt device can be carried without being assembled with a pillar cover to the assembly line for production of an automobile.

When the lap belt anchor is engaged with the insertion member, the stopper is in the escape position so that the lap belt anchor can be smoothly engaged with the insertion member. As the lap belt anchor is fully engaged with the insertion member, the stopper is elastically returned to its prevention position, thereby securely coupling the lap belt to the tongue body.

According to another embodiment of the present invention, a tongue of an inflatable belt device includes a tongue body which can be latched with a buckle and to which a shoulder belt including an inflatable belt is connect. A lap belt anchor may be coupled to the tongue body. The tongue body is provided with at least one insertion opening for the lap belt anchor and the lap belt anchor is provided with at least one hook to be inserted into the insertion opening in order to engage with the tongue body. The hook may be elastically displaced or deformed in order to pass through the insertion opening. The hook is returned to its original position or its original configuration after passing through the insertion opening in order to engage with the tongue body.

The lap belt anchor may be coupled to the tongue body by inserting the lap belt anchor having the insertion opening. The hook may be displaced or deformed to pass through the insertion opening when the lap belt anchor is inserted into the insertion opening, so that the lap belt anchor can be inserted deeply into the insertion opening. After the hook passes through the insertion opening, the hook is returned to its holding position or holding configuration, thereby securely coupling the lap belt anchor to the tongue body.

According to another embodiment of the present invention, a tongue of an inflatable belt device may include a tongue body which can be latched with a buckle and to which a shoulder belt composed of an inflatable belt may be connected. A lap belt through hole is formed in the tongue body. A lap belt is provided, a front end portion of the lap belt passes through the lap belt through hole and is held by an edge portion of the lap belt through hole. The lap belt is provided at its front end with a hoop portion. The front end of the lap belt is held by an edge portion of the lap belt through hole with a bar member inserted into the hoop portion.

According to another embodiment of the present invention, the tongue of the inflatable belt device may be configured so that after the front end portion of the lap belt passes through the through hole of the tongue body, the bar member is inserted into the hoop portion of the front end portion of the lap belt in order to hold the front end portion of the lap belt at the edge portion of the through hole. Both ends of the bar member may be engaged by edge portions of the through hole. Alternatively, the hoop portion may be engaged by the edge portions of the through hole by increasing the thickness of the hoop portion due to the insertion of the bar member into the hoop portion.

According to yet another embodiment of the present invention, bar member can be elastically deformed such that the bar member in the state inserted into the hoop portion can pass through said lap belt through hole, and can be elastically returned to be held by the edge portion of the lap belt through hole after passing through the lap belt through hole.

According to the present invention, the bar member may be inserted into the hoop portion of the front end portion of the lap belt. The hoop portion is then passed through the lap belt through hole. The bar member elastically deforms to allow the hoop portion to pass through the lap belt through hole. After the hoop portion is passed through the lap belt through hole, the bar member elastically returns to its original form and engages the edge portion of the lap belt through hole.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Hereinafter, embodiments of the present invention will be described with reference to the drawings.

Figure 1:
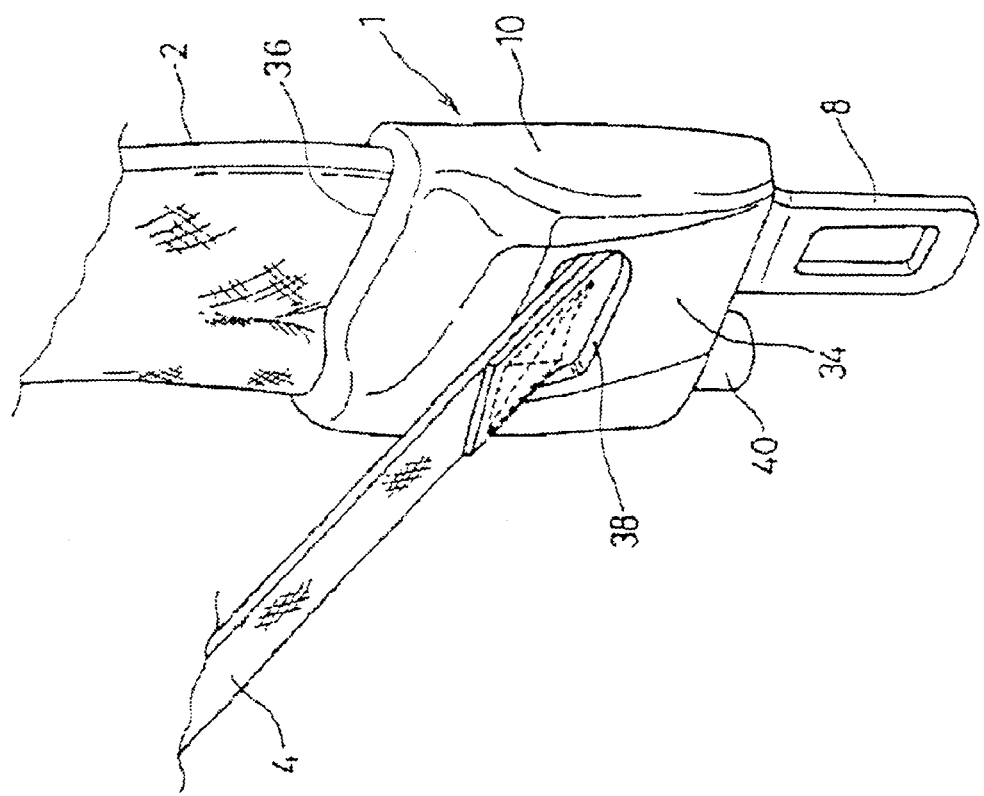
FIG. 1 is a perspective view of a tongue of an inflatable belt device according to an embodiment of the present invention.

As shown in FIG. 1, the inflatable belt device comprises a tongue 1, a shoulder belt 2 composed of an inflatable belt, and a lap belt 4 composed of a normal webbing. Rear end portions of the shoulder belt 2 and the lap belt 4 may be wound up by a shoulder belt retractor and a lap belt retractor (both not shown), respectively. Each of the retractors may include a return spring which always biases the shoulder belt 2 or the lap belt 4 in the winding direction, and an emergency locking mechanism for preventing the shoulder belt 2 or the lap belt 4 from being withdrawn in emergency situations, e.g. in the event of a vehicle collision.

Figure 3:
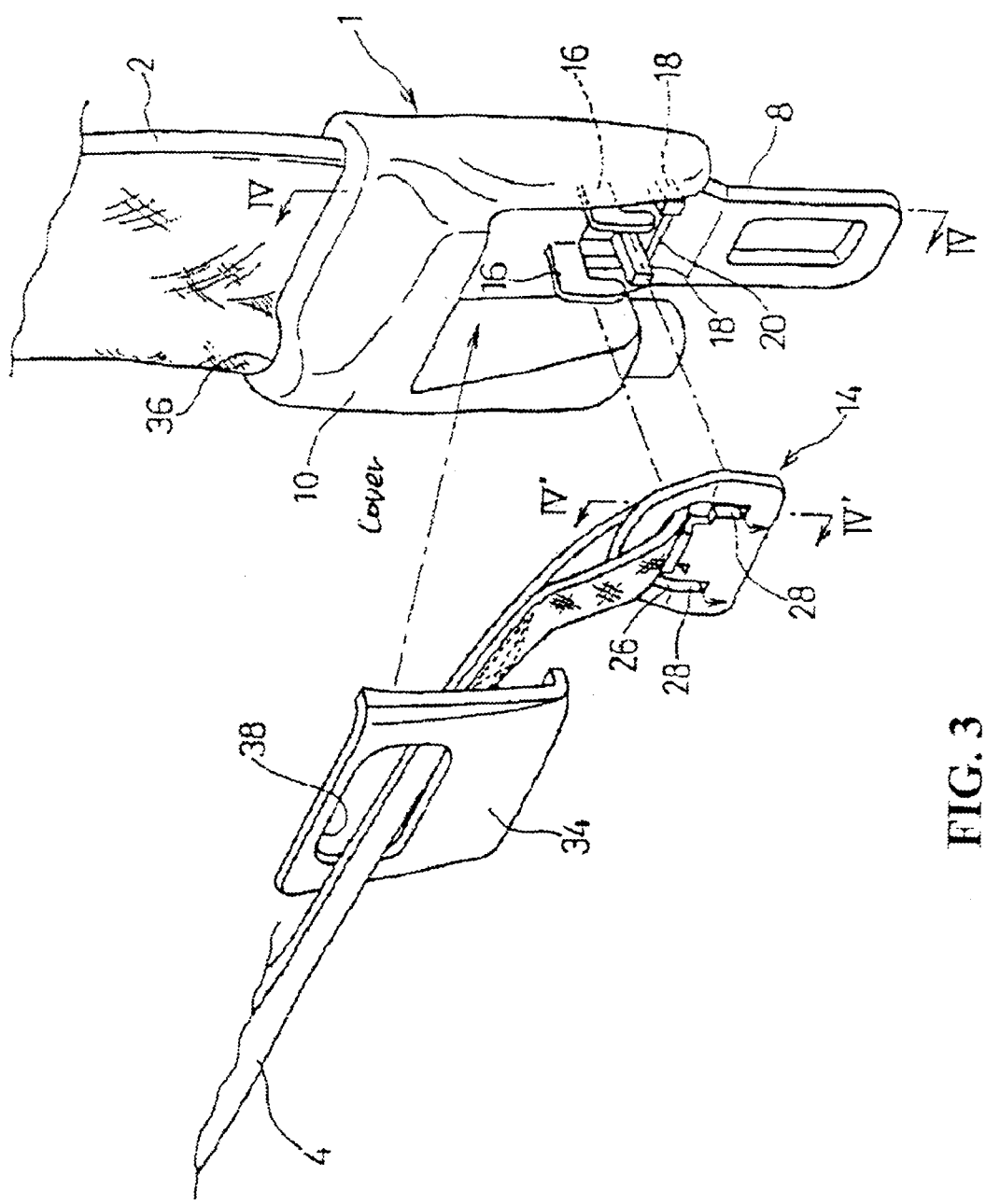
FIG. 3 is an exploded perspective view of a coupling structure between the tongue and a lap belt anchor.

The front end portions of the shoulder belt 2 and the lap belt 4 are connected to a tongue 1. The tongue 1 comprises a tongue plate 8 having a front portion configured to be latched with a buckle (not shown) and a cover 10 surrounding a rear portion of the tongue plate 8. The front end portion of the shoulder belt 2 is inserted into a shoulder belt through hole 12 formed in the rear end portion of the tongue plate 8. The belt 2 is folded double or looped at the through hole 12, and is sewn together with a portion of the shoulder belt 2 following the front end portion. The front end portion of the lap belt 4 is connected to the tongue plate 8 through the lap belt anchor 14, as shown in FIG. 3.

Figure 4:
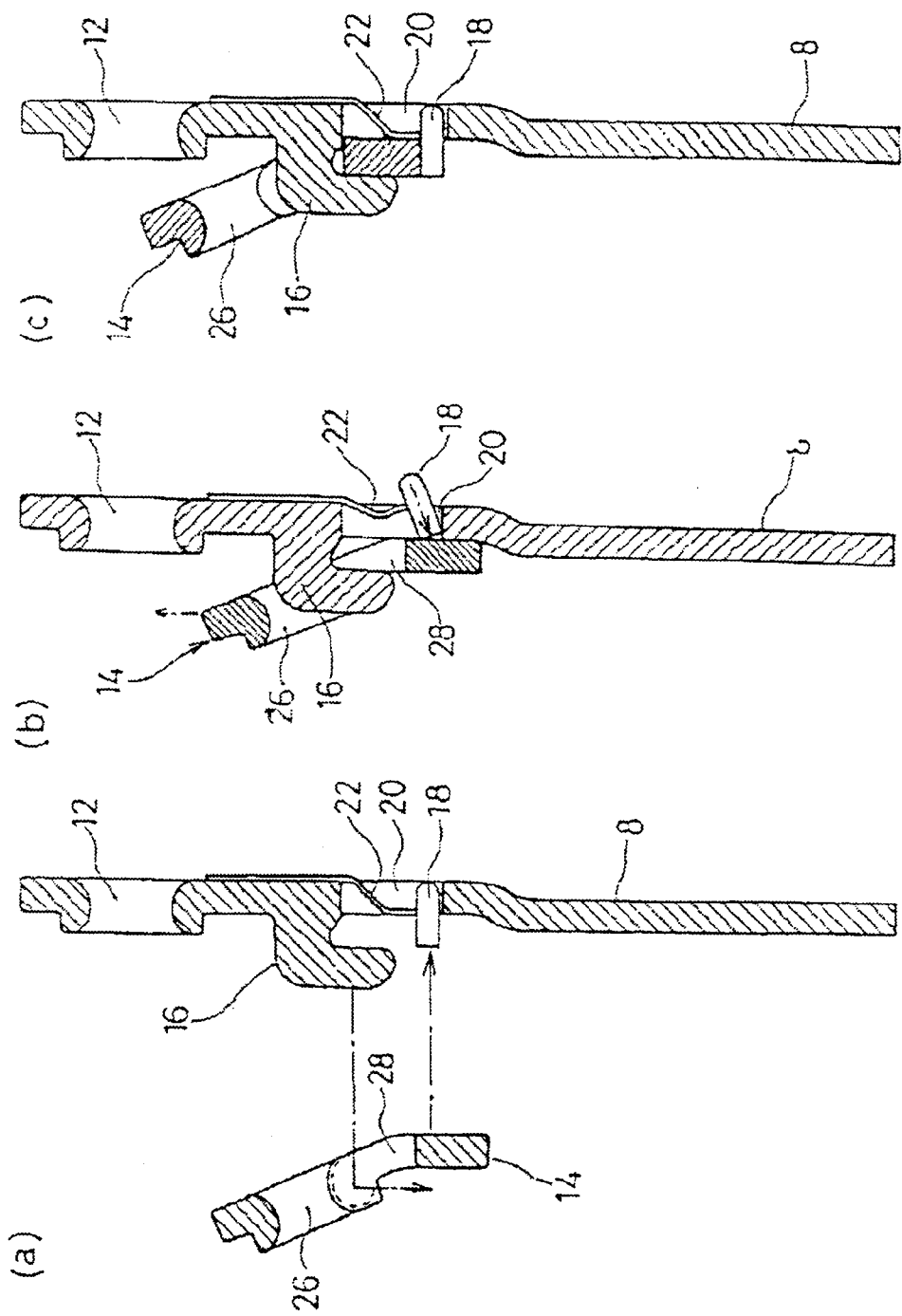
FIGS. 4(a)–4(c) show the tongue and the lap belt anchor in sections taken along lines IV—IV and IV'—IV' of FIG. 3.

As shown in FIGS. 4(a)–4(c), the tongue plate 8 is provided on its one surface with hook-like projections 16 (i.e., insertion members) for coupling the lap belt anchor 14 to the tongue plate 8, and stoppers 18 for preventing the lap belt anchor 14, after it is engaged with the projections 16, from coming off the projections 16.

Each projection 16 is formed in L-like shape of which a proximal end portion projects from the tongue plate 8 and a distal end portion extends toward the front end (the lower end in FIGS. 4(a)–4(c)) of the tongue plate 8. The distal end portion of the projection 16 is inserted into the lap belt anchor 14.

The stoppers 18 are arranged inside an opening 20 formed in the tongue plate 8 in the vicinity of the projections 16. The stoppers 18 are supported by plate springs 22. The stoppers 18 are elastically deformable in the lateral direction in FIGS. 4(a)–4(c).

The lap belt anchor 14 includes receiving holes 28 for engaging the projections 16, and a lap belt through hole 26 for connecting the lap belt 4. The front end portion of the lap belt 4 is inserted into the through hole 26 and is folded double or looped at the through hole 26. The front end portion of the lap belt is sewn together with a portion of the lap belt 4 following the front end portion, thereby connecting the front end portion of the lap belt 4 to the lap belt anchor 14.

The lap belt anchor 14 engages with the projections 16 by inserting the distal end portions of the projections 16 into the receiving holes 28 and sliding the lap belt anchor 14 rearward (upward in FIGS. 1–4(c)) along the tongue plate 8. As the distal end portions of the projections 16 are engaged with the receiving holes 28.

When coupling the lap belt anchor 14 to the tongue plate 8, the lap belt anchor 14 presses the stoppers 18 to the right as shown in FIGS. 4(a)–4(c). The stoppers 18 are moved by the lap belt anchor 14 against the biasing force of the respective plate springs 22. As the projections 16 enter into the receiving holes 28, the lap belt anchor 14 is slid upward, as shown in FIG. 4(c), so that the stoppers 18 return to their original positions by the restoring force of the plate springs 22 and come in contact with the front end face (the bottom face in FIGS. 4(a)–4(c)) of the lap belt anchor 14. The plate springs 22 are fixed to extend along the tongue plate 18. As a result, the stoppers 18 never move downward even when the lap belt anchor 14 is loaded to slide downward in the coupled state shown in FIG. 4(c), thereby preventing the lap belt anchor 14 from moving downward. Therefore, the lap belt anchor 14 is held in the state coupled to the tongue plate 8 via the projections 16.

Figure 2:
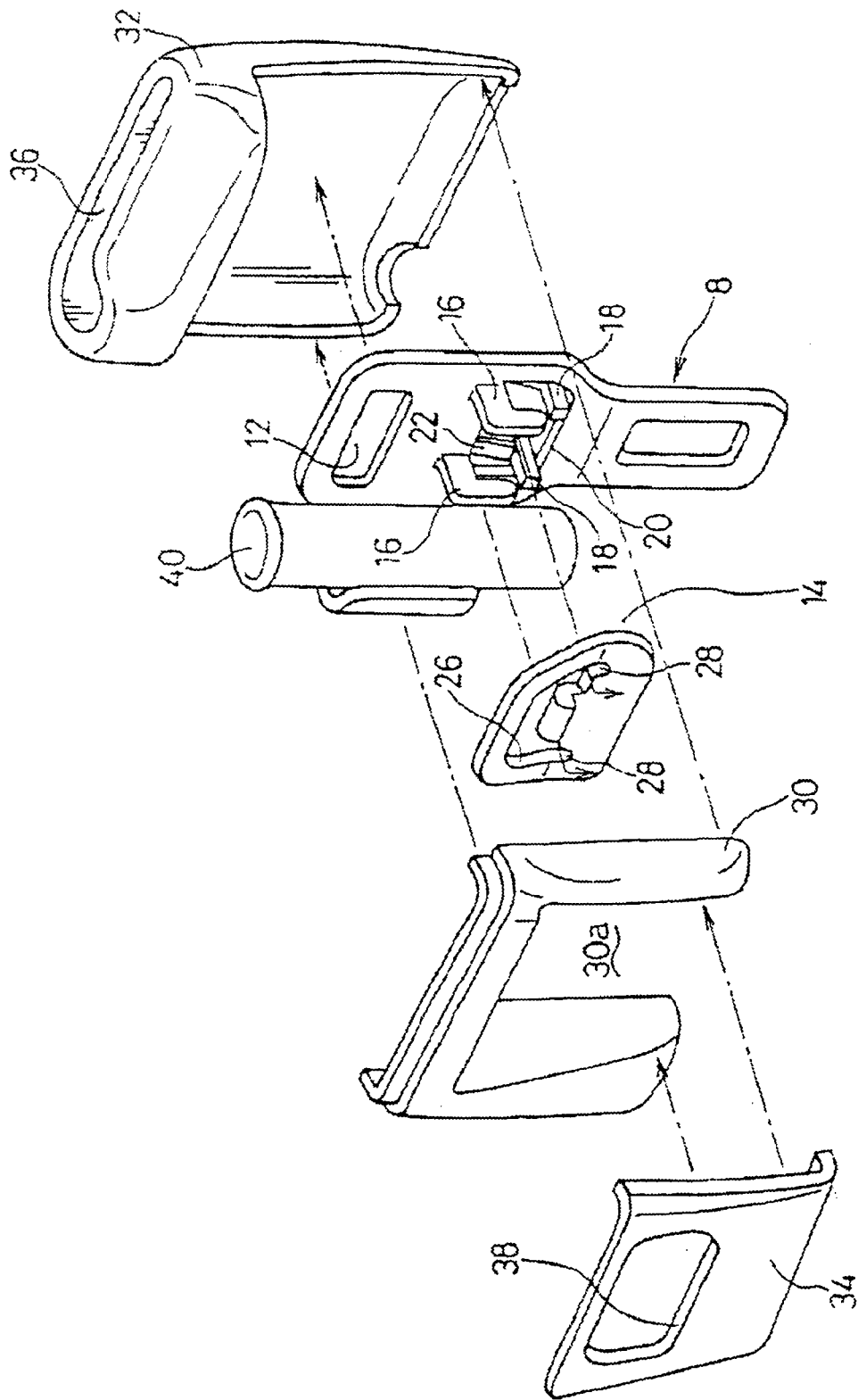
FIG. 2 is an exploded perspective view of the tongue of FIG. 1.

As shown in FIG. 2, the cover 10 comprises a pair of cover halves 30 and 32 sandwiching the tongue plate 8 from both sides. The cover halves 30, 32 may be fixed to each other, for example, by vises, adhering, or welding. One cover half 30 is formed in a U-like shape having an aperture 30a opening downward in FIG. 2. The projections 16 and the lap belt anchor 14 are positioned inside the aperture 30a. A lid member 34 is fixed to the cover half 30 by vises so as to cover the aperture 30a. The lap belt 4 passes through a lap belt through hole 38 formed in the lid member 34 and extends out of the cover 10.

The lap belt anchor 14 is coupled to the tongue plate 8 according to the aforementioned procedure so that the lid member 34 is not fixed and the projections 16 of the tongue plate 8 are thus exposed. The lap belt anchor 14 is configured to be inserted into the lap belt through hole 38. After the lap belt anchor 14 is engaged with the projections 16 so that the lap belt anchor 14 is coupled to the tongue plate 8, the lid member 34 is fixed to the cover half 30.

The shoulder belt 2 may include an inflatable belt inserted through a through hole 36 of the cover half 32. The shoulder belt 2 is connected to the through hole 12 of the tongue plate 8.

As shown in FIG. 2, a pipe-like gas passage (duct) 40 for introducing gas into the shoulder belt 2 may be fixed to the tongue plate 8. The duct 40 extends along the side of the tongue plate 8 in the insertion direction of the tongue plate 8 (in the vertical direction of FIG. 2).

The shoulder belt 2 includes a bag formed in a long envelope shape into which gas is introduced and a mesh cover for covering the bag. The mesh cover is expandable in its width direction, but not expandable in its longitudinal direction. A front end portion of the mesh cover is inserted into the shoulder belt through hole 12 of the tongue plate 8, is folded double at the through hole 12, and is superposed on and sewn together with a portion of the mesh cover following the front end portion.

The front end of the aforementioned duct 40 projects from the front end face of the cover 10 to receive gas flowing from the buckle side. The rear end portion of the duct 40 is inserted into the bag by penetrating the mesh cover to send the gas into the bag.

The tongue 1, configured as described above, enables the lap belt anchor 14 to be coupled to the tongue plate 8 by just one action and enables the lid member 34 to be fixed to the cover half 30 with vises during the assembly line of the automobile. Therefore, the shoulder belt 2 and the lap belt 4 can be inserted through the webbing through holes of the pillar cover during the assembly line of the automobile and, after that, the lap belt anchor 14 at the front end of the lap belt 4 can be coupled to the tongue plate 8. As a result, the inflatable belt device is not necessary to be assembled with the pillar cover by the manufacturer of the inflatable belt device.

Figure 5:
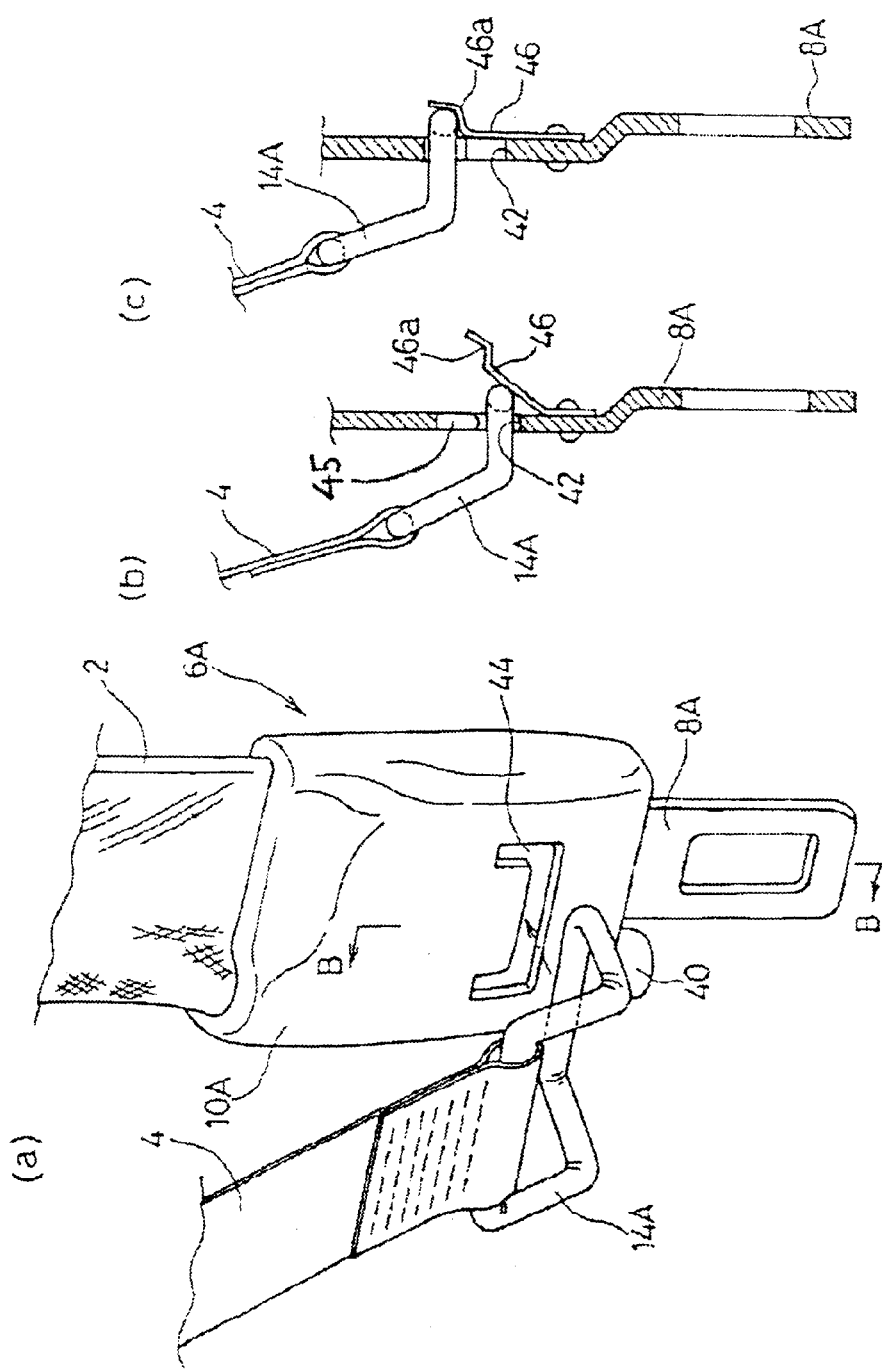
FIG. 5(a) is a perspective view of a tongue and parts around it of an inflatable belt device according to another embodiment of the present invention.
FIGS. 5(b)–5(c) are sectional views taken along a line B—B of FIG. 5(a), respectively, showing coupling means for the tongue and a lap belt anchor.

FIGS. 5(a)–5(c) disclose an alternative embodiment of the present invention. In this embodiment, a front end portion of a lap belt 4 is connected to a ring-like lap belt anchor 14A formed in a rectangle frame shape. The front end portion of the lap belt 4 is hooked on an edge at the rear end side of the lap belt anchor 14A, is folded double or looped at the edge, and is sewn together with a portion of the lap belt 4 following the front end portion. The lap belt anchor 14A is engaged with a U-like engaging hole (i.e., an insertion opening) 42 formed in the tongue plate 8A, whereby the lap belt anchor 14A is coupled to the tongue 6A. The U-shaped hole 44 creates a projection or insertion member 45 in the tongue plate.

The cover 10A is provided with a lap belt anchor through hole 44 having the same size and the same configuration as the U-like engaging hole 42. The lap belt anchor 14A is engaged with the engaging hole 42 after passing through the lap belt anchor through hole 44.

As a stopper for preventing the lap belt anchor 14A from disengaging with the engaging hole 42, a plate spring 46 is attached to a surface opposite to the surface of the tongue plate 8A in which the lap belt anchor through hole 44 is formed. The plate spring 46 is fixed to the tongue plate 8A at a position near one end of the engaging hole 42, at the front end side of the tongue plate 8A i.e. of the insertion direction, with rivets or by spot welding. The other end portion of the plate spring 46 extends in such a manner as to cover the engaging hole 42.

As the lap belt anchor 14A is inserted into the engaging hole (insertion opening) 42, the plate spring 46 is elastically moved to the right in FIGS. 5(b), 5(c). As the front portion of the frame-like lap belt anchor 14A is inserted into the engaging hole 42 and is then slid upward in FIGS. 5(b), 5(c) so that the lap belt anchor 14A engages with the insertion member 45, the plate spring 46 is returned to its original configuration (superposed on the tongue plate 8A) as shown in FIG. 5(c).

The upper portion of the plate spring 46 is bent in a crank shape and functions as an anchor receiving portion 46a. In the engaged position shown in FIG. 5(c), the lap belt anchor 14A is engaged with the anchor receiving portion 46a so that the lap belt anchor 14A is prevented from moving downward. Therefore, the lap belt anchor 14A is prevented from coming off the tongue plate 8A. The other structure of the tongue shown in FIGS. 5(a)–5(c) is generally the same as that of the tongue shown in FIGS. 1–4(c).

Figure 6:
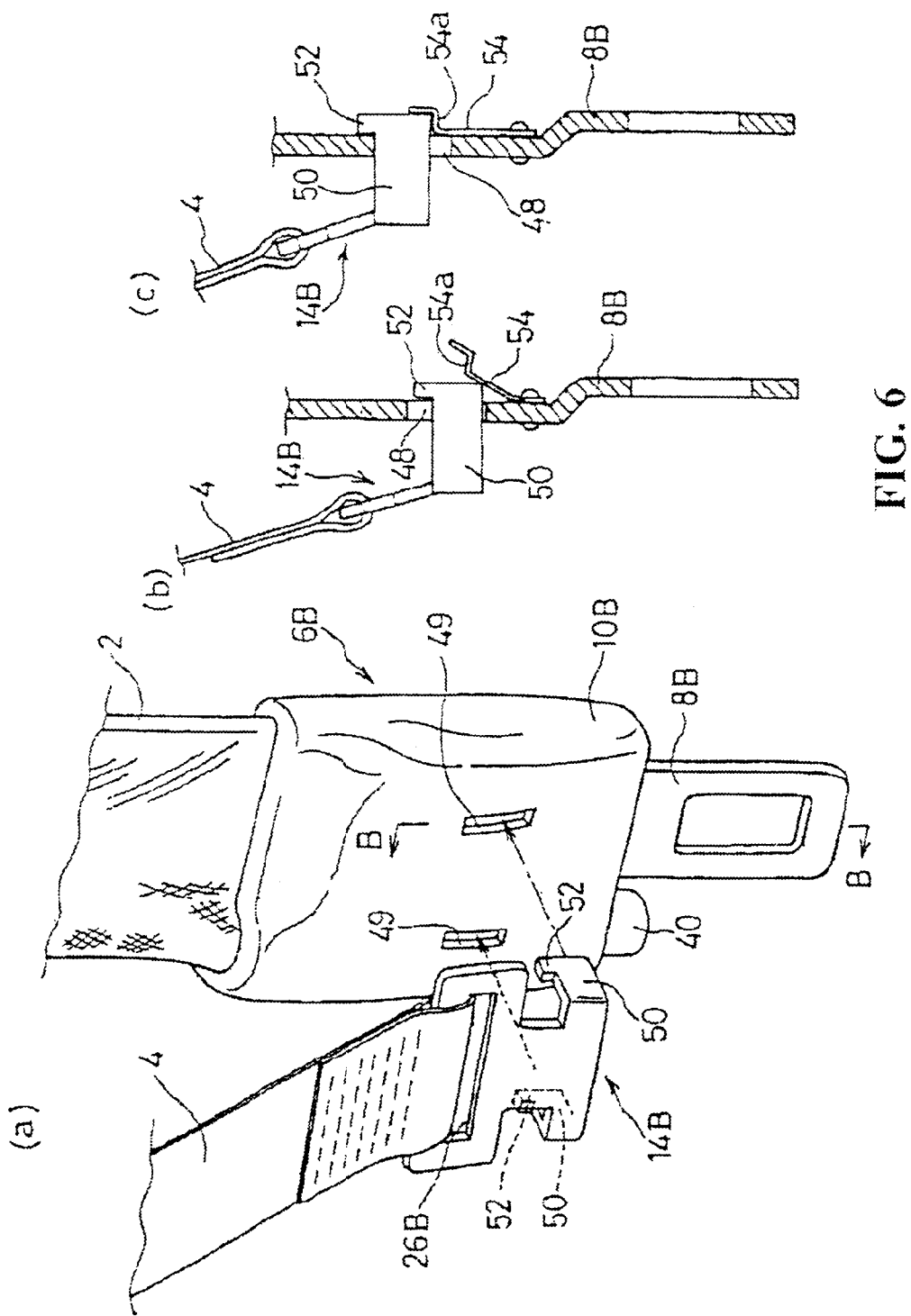
FIG. 6(a) is a perspective view of a tongue and parts around it of an inflatable belt device according to another embodiment of the present invention.
FIGS. 6(b), 6(c) are sectional views taken along a line B—B of FIG. 6(a), respectively, showing a coupling procedure for the tongue and a lap belt anchor.

In the embodiment shown in FIGS. 6(a)–6(c), a tongue plate 8B is formed with slit-like lap belt anchor engaging holes (insertion openings) 48 extending the insertion direction of the tongue plate 8B (the vertical direction in FIGS. 6(a)–6(c)). A tongue cover 10B has lap belt anchor through holes 49 having the same configuration and the same size as the engaging holes 48. The lap belt anchor through holes 49 are formed at locations corresponding to the engaging holes 48. A lap belt anchor 14B is provided with hook-like insertion pieces 50 which are engagable with the engaging holes 48.

Each insertion piece 50 is provided at its end with an engaging projection 52 projecting upward. Similarly to the aforementioned embodiments, an end portion of the lap belt 4 is inserted into a lap belt through hole 26B of the lap belt anchor 14B, double folded and sewn together.

Plate springs 54 are disposed on the tongue plate 8B as stoppers for preventing the lap belt anchor 14B from disengaging with the engaging holes 48. Similarly to the plate spring 46 shown in FIGS. 5(a)–5(c), one end portion of each plate spring 54 is secured to a surface opposite to the surface of the tongue plate 8B in which the lap belt anchor through hole 44 is formed. The other end portion of the plate spring 54 extends in such a manner as to cover the engaging hole (insertion opening) 48 and is bent in a crank shape so as to function as a lap belt anchor receiving portion 54a.

As the lap belt anchor 14B moves upward after being inserted into the engaging holes 48 as shown in FIG. 6(b), the projections 52 engage with upper edges of the engaging holes 48 as shown in FIG. 6(c). During insertion, as shown in FIG. 6(b), each plate spring 54 moves elastically to the right in FIGS. 6(b), 6(c). In the engaged state as shown in FIG. 6(c), each plate spring 54 is returned to its original configuration. During this, each lap belt anchor receiving portion 54a is engaged with a lower edge of the lap belt anchor 14B in order to prevent the lap belt anchor 14B from moving downward. Therefore, the lap belt anchor 14B is maintained engaged with the tongue plate 8B. The other structure of the tongue shown in FIGS. 6(a)–6(c) is generally the same as that of the tongue shown in FIGS. 1–4(c).

Figure 7:
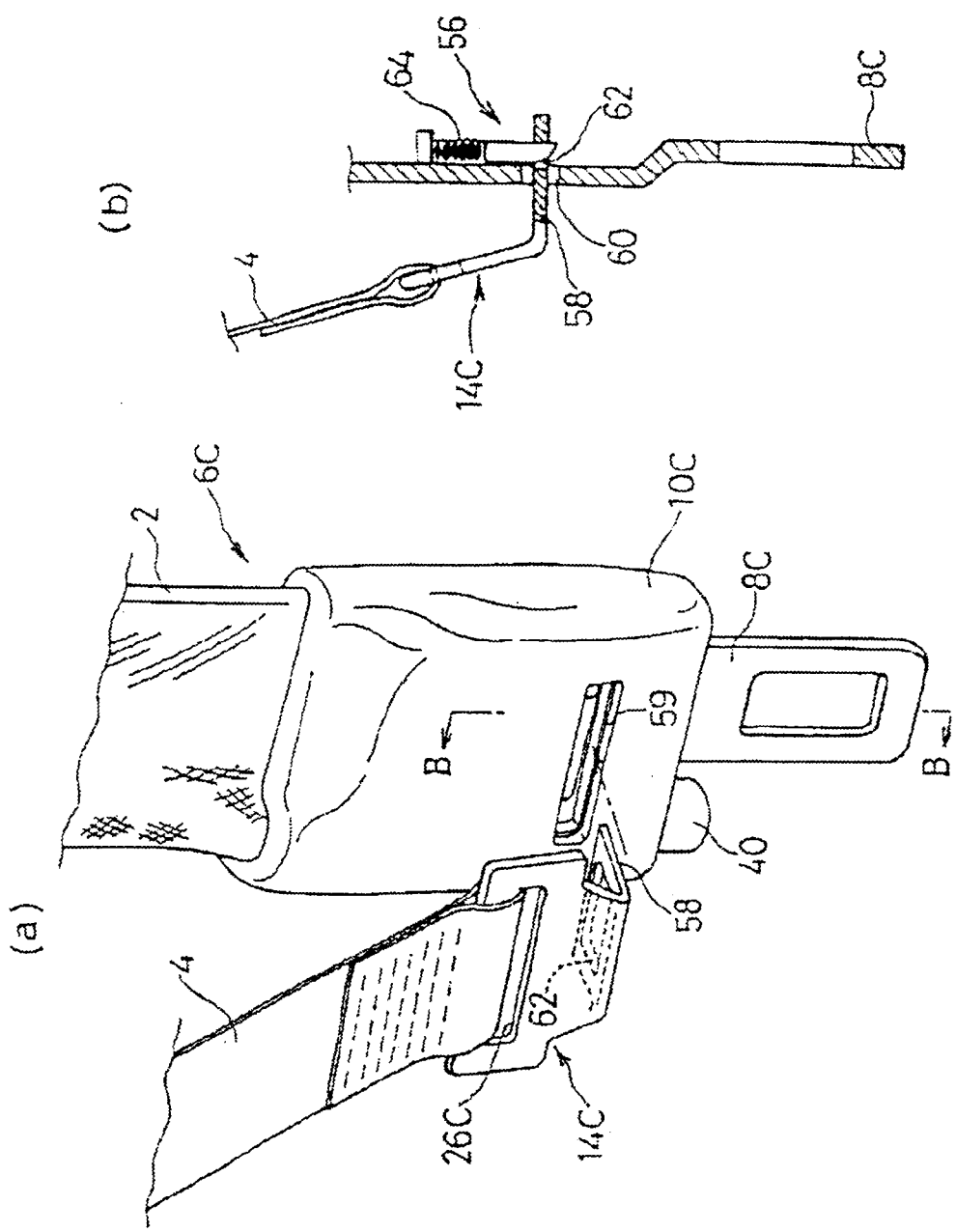
FIG. 7(a) is a perspective view of a tongue of an inflatable belt device according to another embodiment.
FIG. 7(b) is a sectional view taken along a line B—B of FIG. 7(a).

In the embodiment shown in FIGS. 7(a)–7(b), a tongue 6C is provided with a stopper 56 of a latch type. A front end portion 58 of the lap belt anchor 14C is inserted into a lap belt anchor insertion opening (engaging hole) 60 of a tongue plate 8C through a through hole 59 of the tongue cover 10C for coupling a lap belt anchor 14C to the tongue 6C. Accordingly, a latch hole 62 formed in the front end portion 58 is latched by the stopper 56, whereby the latch belt anchor 14C is coupled to the tongue 6C.

The stopper 56 is slidable along the tongue plate 8C and is biased by a spring 64 in a direction toward the front end of the tongue plate 8C (downward in FIGS. 7(a), 7(b)). As shown in FIGS. 7(a), 7(b), the lower end of the stopper 56 includes a slant face. When the lap belt anchor 14C is inserted into the lap belt anchor insertion opening (engaging hole) 60, the stopper 56 receives an upward force because of its slant face and, as a result, moves upwardly, thereby allowing the insertion of the lap belt anchor 14C. As the lap belt anchor 14C is inserted to a position where the latch hole 62 and the stopper 56 overlap with each other, the stopper 56 moves downwardly by the biasing force of the spring 64 to enter into the latch hole 62, whereby the lap belt anchor 14C is latched. The other structure of the tongue shown in FIGS. 7(a), 7(b) is generally the same as that of the tongue shown in FIGS. 1–4(c).

Figure 8:
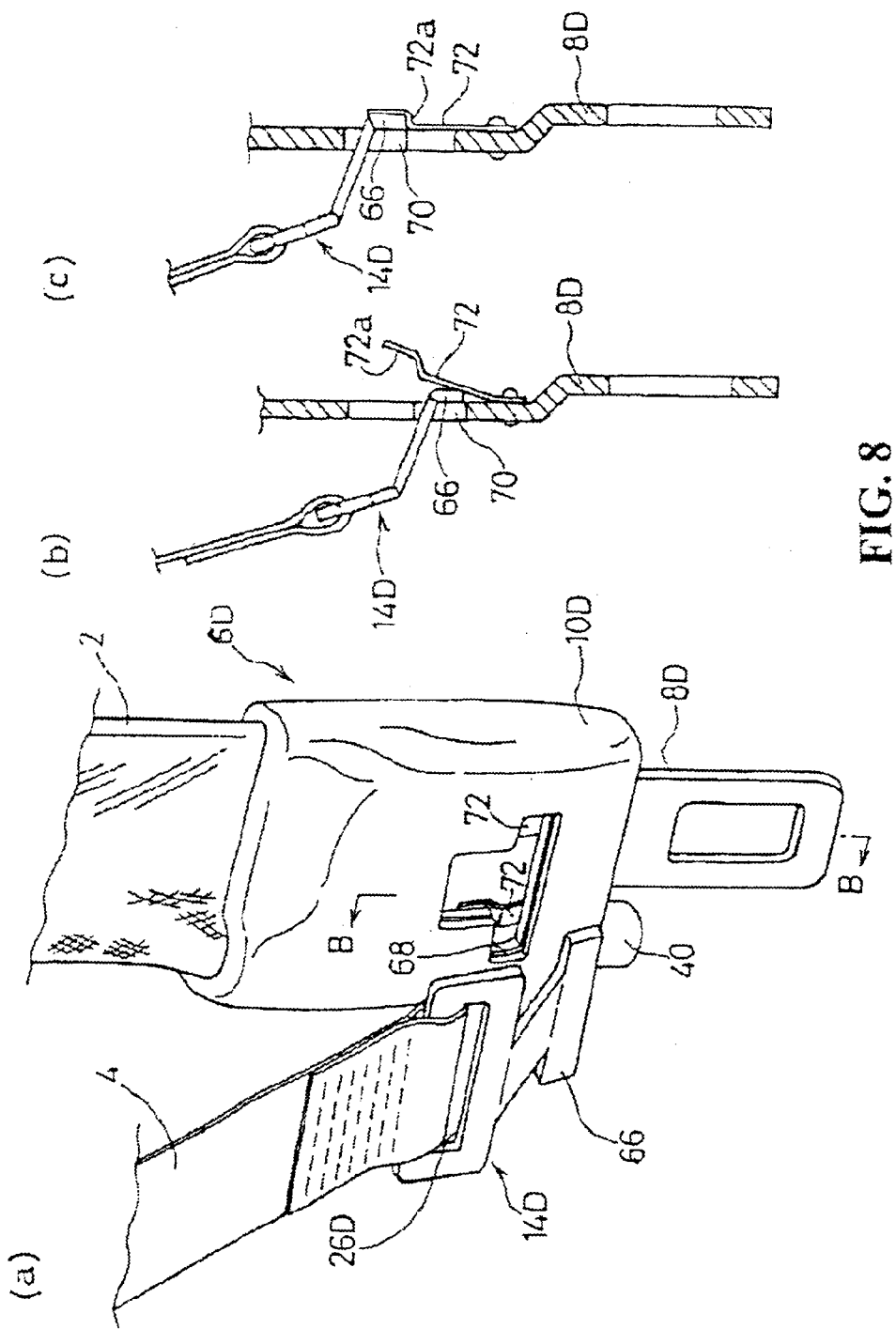
FIG. 8(a) is a perspective view of a tongue and parts around it of an inflatable belt device according to another embodiment of the present invention.
FIGS. 8(b), 8(c) are sectional views taken along a line B—B of FIG. 8(a), respectively, showing a coupling procedure for the tongue and a lap belt anchor.

In the embodiment shown in FIGS. 8(a)–8(c), a front end portion of a lap belt 4 is hooked by a lap belt through hole 26D of a lap belt anchor 14D. The front end portion of the lap belt 4 is hooked on an edge of the lap belt through hole 26D of the lap belt anchor 14A, and is double folded or looped at the edge, and sewn together with a portion of the lap belt 4 following the front end portion.

The lap belt anchor 14D is provided with an insertion piece 66 formed in a T-like shape. A tongue cover 10D is formed with a through hole 68 for receiving the insertion piece 66 and a tongue plate 8D is formed with an insertion opening (engaging hole) 70 for receiving the insertion piece 66. The through hole 68 and the insertion opening (engaging hole) 70 are T-like openings having a size slightly larger than the insertion piece 66.

Plate springs 72 are attached to a surface opposite to the surface of the tongue plate 8D in which the lap belt anchor through hole 68 is formed. The plate springs 72 function as stoppers for preventing the insertion piece 66 of the lap belt anchor 14D engaged with the engaging hole 70 from coming off the engaging hole 70. Each plate spring 72 is fixed to the tongue plate 8D at a position near one end of the plate spring 72, at the front end side of the tongue plate 8D i.e. of the insertion direction (in the downward direction of FIGS. 8(a)–8(c)). The plate springs 72 are attached to the tongue plate 80 with rivets or by spot welding, for example, the other end portion of the plate spring 72 extends to cover the engaging hole 70. As the insertion piece 66 of the lap belt anchor 14D is inserted into the engaging hole (insertion opening) 70, the plate springs 72 move elastically to the right in FIGS. 8(b), 8(c). As the insertion piece 66 of the lap belt anchor 14D is inserted into the engaging hole 70 and is then slid upward in FIGS. 8(b), 8(c) so that the lap belt anchor 14D becomes in a state engaged with the engaging hole 70, the plate springs 72 are returned to their original configurations (superposed on the tongue plate 8D) as shown in FIG. 8(c). The upper portion of each plate spring 72 is bent in a crank shape and functions as an anchor receiving portion 72a. In the engaged state shown in FIG. 8(c), the lap belt anchor 14D is engaged with the anchor receiving portions 72a and is prevented from moving downward. Therefore, the lap belt anchor 14D is prevented from coming off the tongue plate 8D.

Figure 9:
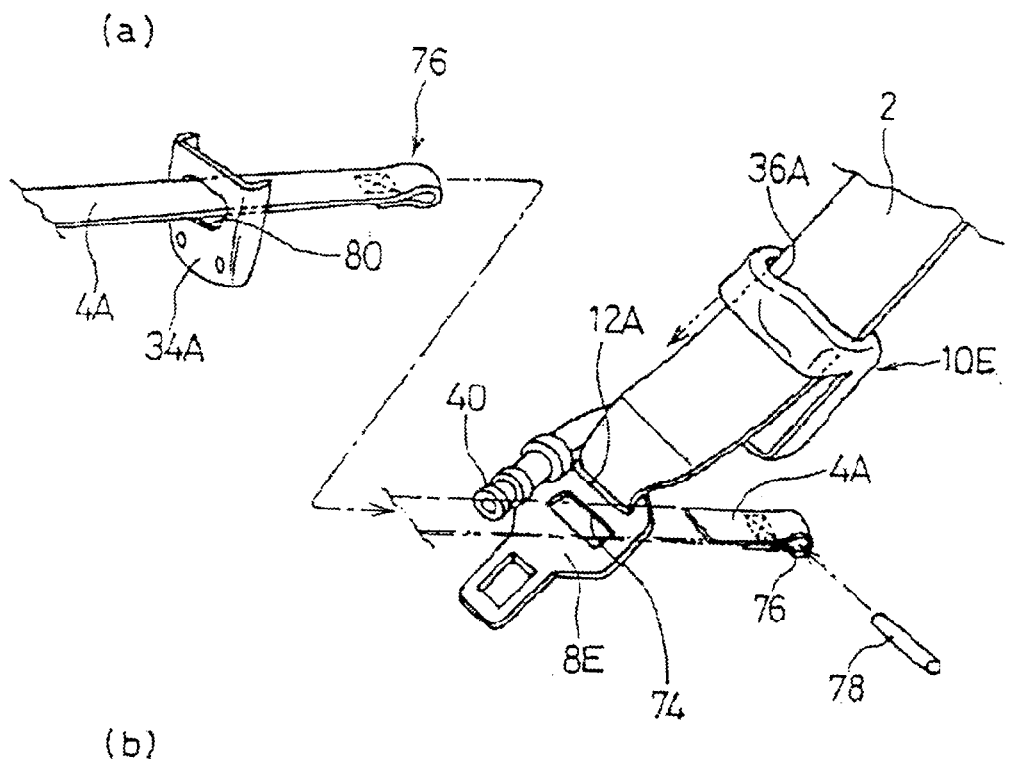
FIG. 9(a) is an exploded perspective view of a lap belt anchor and tongue according to another embodiment of the present invention.
FIG. 9(b) is a perspective view of the embodiment of FIG. (9a) after coupling of the lap belt to the tongue.
Figure 9:
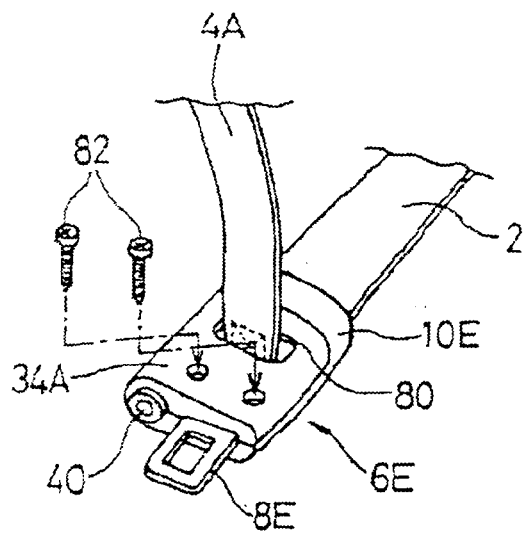

FIGS. 9(a), 9(b) are exploded perspective views showing a coupling procedure for a lap belt and a tongue of an inflatable belt device according to further another embodiment of the present invention. As shown in FIG. 9(a), the inflatable belt device comprises a shoulder belt 2 composed of an inflatable belt, and a lap belt 4A composed of a normal webbing. Rear portions of the shoulder belt 2 and the lap belt 4A can be wound up by a shoulder belt retractor and a lap belt retractor (both not shown), respectively. Each of the retractors may include a return spring which always biases the shoulder belt 2 or the lap belt 4 in the winding direction, and an emergency locking mechanism for preventing the shoulder belt 2 or the lap belt 4 from being withdrawn in emergency situations, e.g. in the event of a vehicle collision. The front end portions of the shoulder belt 2 and the lap belt 4 are connected to a tongue 6E. The tongue 6E comprises a tongue plate 8E having a front portion configured to be latched with a buckle (not shown) and a cover 10E surrounding a rear portion of the tongue plate 8E.

The front end portion of the shoulder belt 2 is inserted into a shoulder belt through hole 12A formed in the rear end portion of the tongue plate 8E and is double folded or looped at a through hole 12A, and sewn together with a portion of the shoulder belt 2 following the front end portion. A duct 40 is inserted into a bag of the shoulder belt 2, i.e. the inflatable belt, whereby gas is introduced into the bag of the shoulder belt 2 through the duct 40. The duct 40 is fixed along a side of the tongue plate 8E.

The front end portion of the lap belt 4A passes from one side of the tongue plate 8E through a lap belt through hole 74 formed in the tongue plate 8E. The front end portion of the lap belt 4A is looped and is sewn to a portion following the front end portion to form a hoop portion 76.

A bar member (pin) 78 is inserted into the hoop portion 76 for preventing the lap belt 4A from coming off the through hole 74. Both ends of the pin 78 are in contact with portions around the through hole 74 on the other (back) surface of the tongue plate 8E, thereby preventing the front end portion of the lap belt 4A from coming off the through hole 74. Therefore, the front end portion of the lap belt 4A is held inside the through hole 74.

The right half of the cover 10E is configured to cover the other (back) surface of the tongue plate 8E in such a manner as to prevent the pin 78 from coming off the hoop portion 76. The shoulder belt 2 extends through a shoulder belt through hole 36A formed in the rear end face of the cover 10E in the same manner as projecting from the rear end of the tongue 6E.

In the embodiment shown in FIGS. 9(a)–9(b), the left half of the cover 10E is a lid member 34A covering the one surface of the tongue plate 8E. The lid member 34A is formed with a lap belt outlet 80 through which the lap belt 4A extends to the side of the tongue 6E. The right half of the cover 10E and the lid member 34A are connected to each other by vises 82 (i.e., fasteners) and are therefore fixed to the tongue plate 8E.

In order to connect to the tongue plate 8E shoulder belt 2 passes through the shoulder belt through hole 36A of the cover 10E and the lap belt 4A passes through the lap belt outlet 80 of the lid member 34A. The front end portion of the lap belt 4A is passed from the one side of the tongue plate 8E through the lap belt through hole 74 and the pin 78 is inserted into the hoop portion 76 at the end of the lap belt 4A. The both ends of the pin 78 come in contact with the portions around the lap belt through hole 74 of the tongue plate 8E, thereby holding the front end portion of the lap belt 4A to the tongue plate 8E. Next, the right half of the cover 10E and the lid member 34A are put on the tongue plate 8E to cover the tongue plate and are connected to each other by the fasteners 82, thereby completing the connection of the lap belt 4A to the tongue 6E.

According to the inflatable belt device of the present invention, special tools are not required to connect the lap belt 4A and the tongue 6E and the process of connecting the lap belt 4A to the tongue 6E can be conducted as one of a series of steps of assembling the inflatable belt device to the vehicle body. The inflatable belt device has extremely simple structure. Due to this structure, the respective belts can be placed separately from each other during the work of assembling the inflatable belt device to the vehicle body so that the respective belts never disturb the assembling work.

In order to facilitate a requirement that the respective belts must pass through belt through openings of a vehicle interior cover such as a pillar cover, the lap belt 4A is not connected to the tongue 6E during the work of assembling the inflatable belt device to the vehicle body, thereby allowing the belts to be passed through the belt through openings of the vehicle interior cover after the assembling work. Therefore, it is not necessary to pass the respective belts through the belt through openings of the vehicle interior cover before assembling the inflatable belt device to the vehicle body. As a result, it is not necessary to attach the inflatable belt device to the vehicle interior cover before the inflatable belt device is assembled to the vehicle body.

Therefore, the structure of the present invention can reduce the bulk and weight of the assembled inflatable belt device and can significantly reduce the cost for carrying the inflatable belt device to the assembly line of the automobile.

Figure 10:
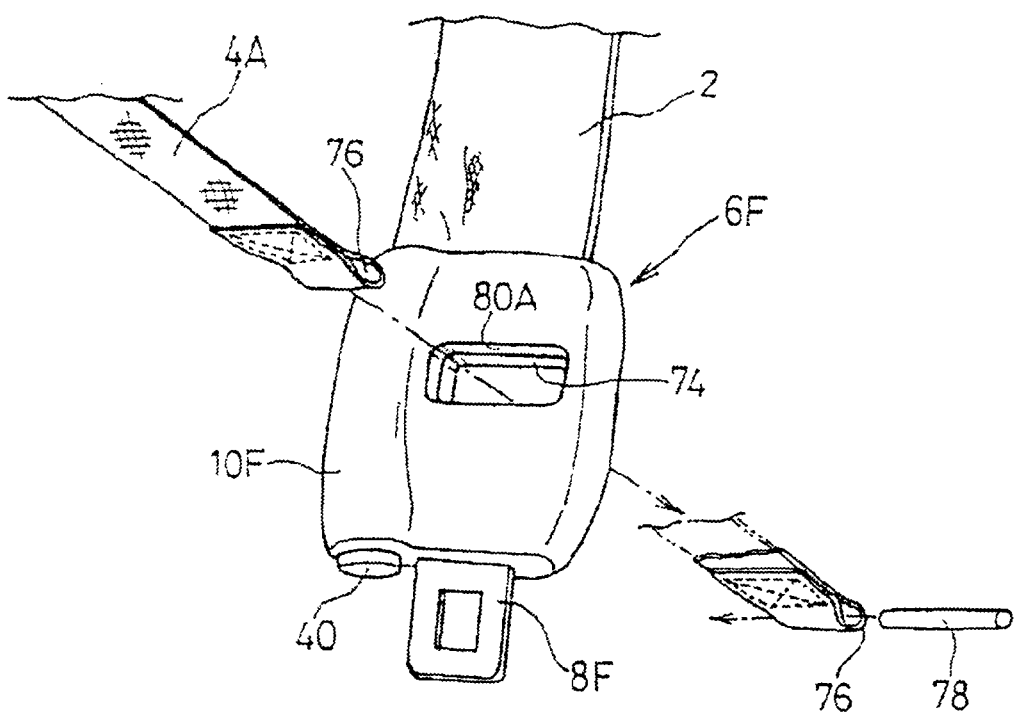
FIG. 10(a) is an exploded view of a lap belt and tongue according to another embodiment of the present invention.
FIG. 10(b) is a perspective view showing the lap belt and tongue of FIG. 10(a) coupled together.
Figure 10:
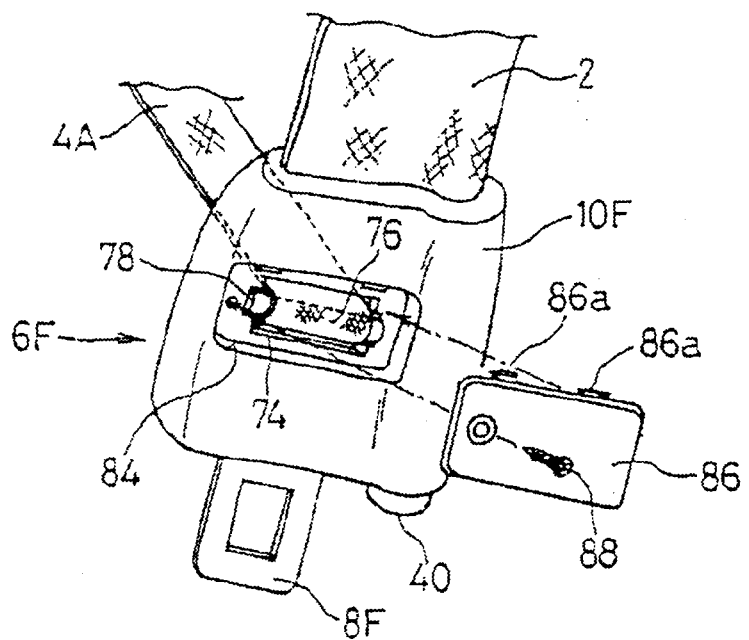

According to an alternative embodiment of the present invention shown in FIGS. 10(a), 10(b), the cover and the lid member attached to the tongue plate for preventing the pin from coming off the hoop portion 76 at the end of the lap belt may have another structure is an exploded perspective view of a tongue of an inflatable belt device according to an embodiment, as seen from one side of the tongue, and FIG. 10(b) is an exploded perspective view of the tongue as seen from the other side of the tongue.

In the embodiment shown in FIGS. 10(a) and 10(b), a tongue 6F comprises a tongue plate 8F and a cover 10F covering substantially entirely the tongue plate 8F. The cover 10F of the tongue 6F has a lap belt outlet 80A and a window or opening 84 which are formed in both surfaces thereof to face the lap belt through hole 74, respectively. A lid 86 is fitted to the opening 84.

A front end portion of the lap belt 4A passes from the one side of the tongue 6F through the outlet 80A, the lap belt through hole 74, and the opening 84. A bar member (pin) 78 is inserted into a hoop portion 76 at the end of the lap belt 4A. Both ends of the pin 78 are caught by portions of both sides of the lap belt through hole 74 of the tongue plate 8F. The opening 84 is closed by the lid member 86. The lid member 86 is fixed to the cover 10F by pawls 86a and fasteners 88.

Figure 11:
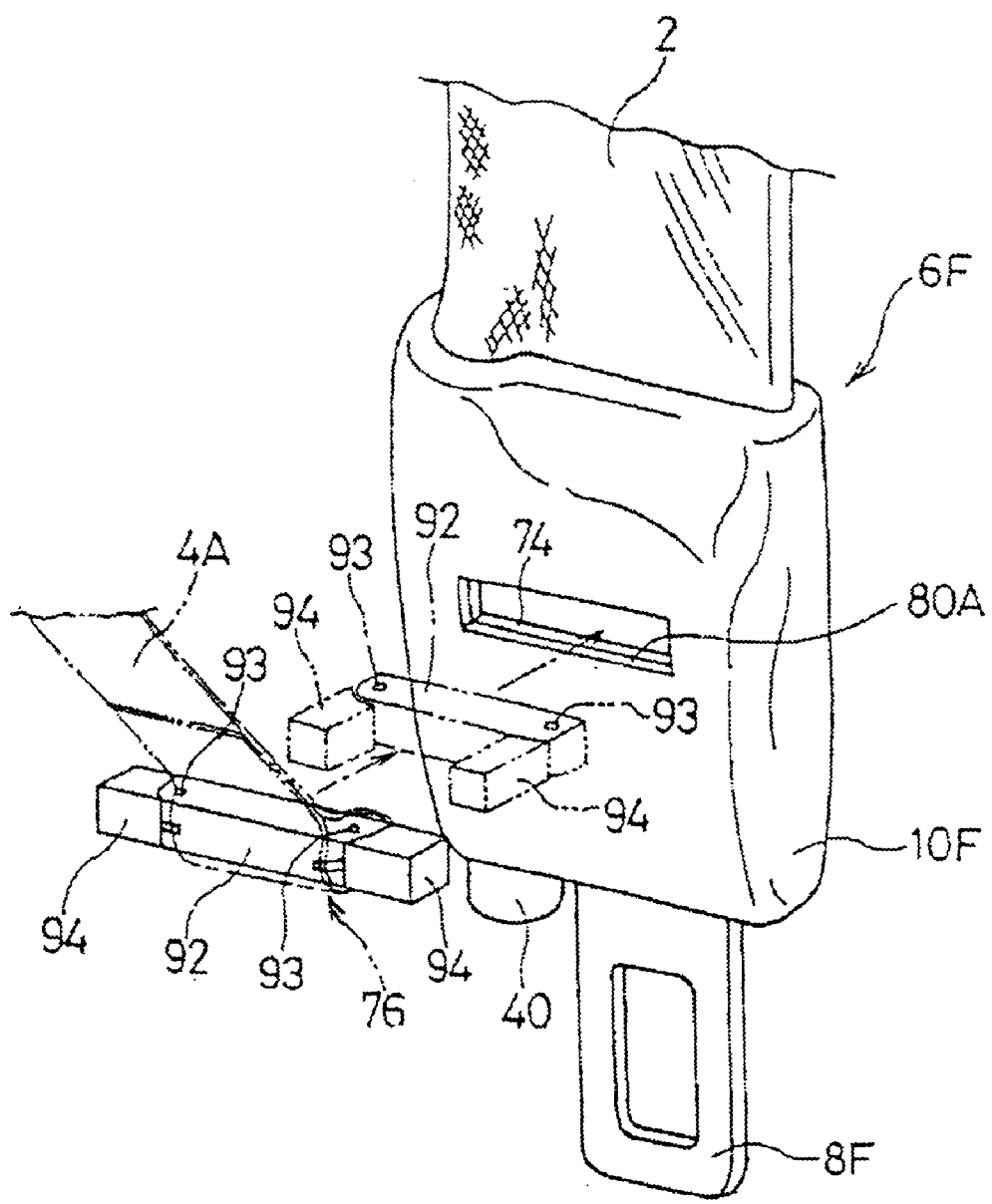
FIG. 11 is a perspective view of a lap belt anchor and tongue according to another embodiment of the present invention.

Preferably, the bar member (pin) 78 is inserted into the hoop portion 76 after the hoop portion 76 of the lap belt 4A is passed through the tongue plate. However, alternatively, a pin 92 of which ends can be elastically bent may be employed instead of the pin 78 and the pin 92 may be inserted into the hoop portion 76 prior to passing the hoop portion 76 through the tongue plate, as shown in FIG. 11.

Both ends of the pin 92 are bendable portions 94 each of which is rotatable about a pivot 93 to extend in a direction perpendicular to the extending direction of the pin 92. The bendable portions 94 are rotatable towards to each other from the state extending in the longitudinal direction of the pin 92. The bendable portions 94 normally extend in the longitudinal direction of the pin 92 by the biasing force of a spring (not shown). The pin 92, when the bendable portions 94 extend in the longitudinal direction of the pin 92, has a length (the maximum entire length) that prevents the pin 92 from passing through the aforementioned through hole 74. As the bendable portions 94 are rotated towards each other, the entire length of the pin 92 is shortened in order to allow the pin 92 to pass through the through hole 74.

First, the pin 92 is inserted into the hoop portion 76. Next, the lap belt 4A with the pin 92 is passed through the outlet 80A, the through hole 74, and the window 84. When passing through, the bendable portions 94 are bent, thereby allowing the pin 92 to pass through the outlet 80A, the through hole 74, and the window 84. After the hoop 76 passes through the openings, the pin 92 is returned to a straight bar configuration so that the pin 92 is held by portions on both sides of the through hole 74. Finally, the lid member 86 is attached.

Figure 12:
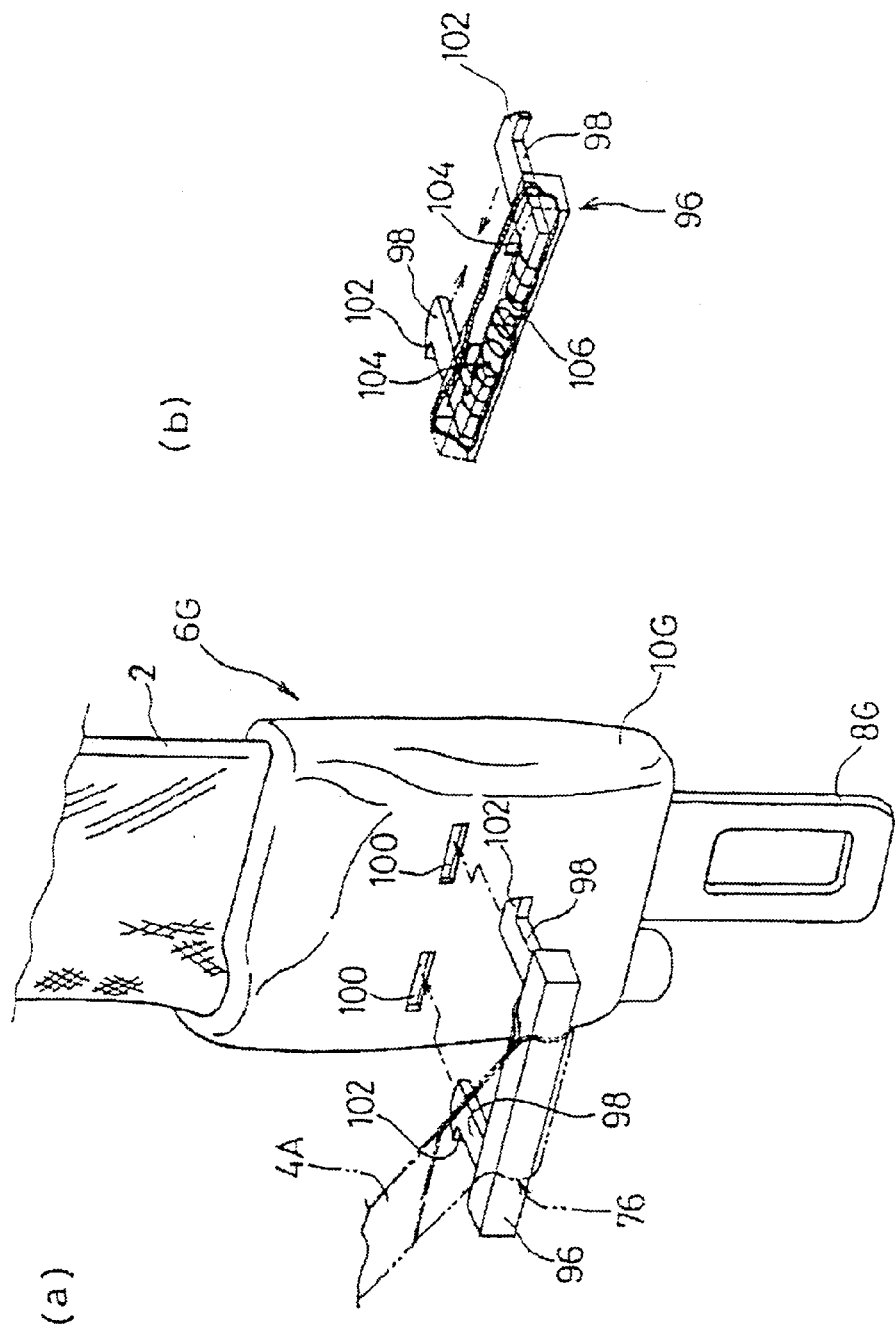
FIG. 12(a) is a perspective view of a lap belt anchor or pin and tongue according to another embodiment of the present invention.
FIG. 12(b) is a partial cutaway view of the pin of FIG. 12(a).
Figure 13:
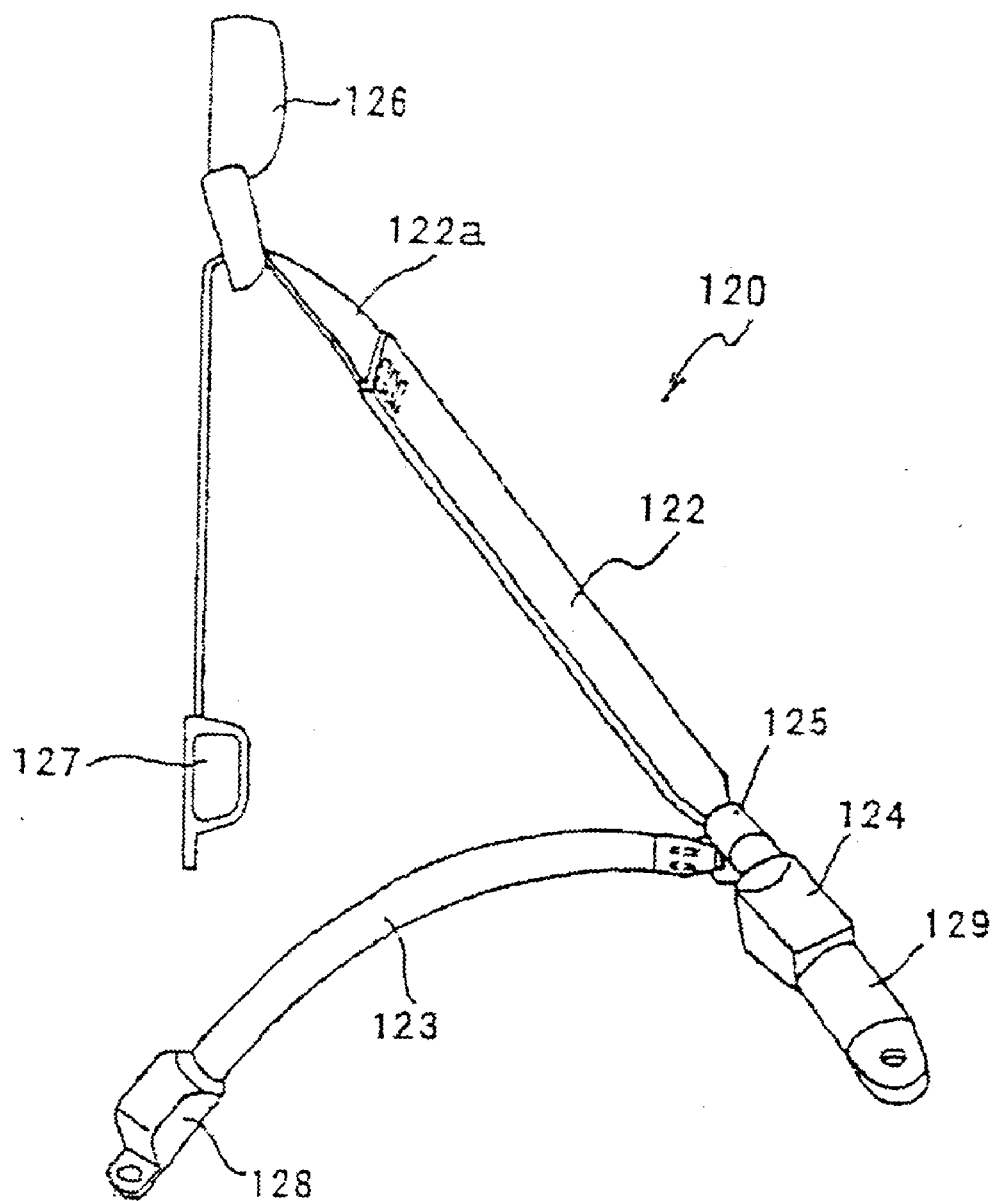
FIG. 13 is a perspective view of a conventional inflatable belt device.

FIGS. 12(*a*) and 12(*b*) show still another embodiment of the present invention. As shown in the figures, a lap belt 4A provided at its end with a hoop portion 76 similarly to the aforementioned embodiments. The lap belt 4A is connected to a tongue 6G by a pin 96 inserted into the hoop portion 76. The pin 96 has a pair of hook-like projections 98 extending in a direction perpendicular to the extending direction of the pin 96. The projections 98 are engaged with through holes 100 formed in the tongue 6G, thereby connecting the pin 96 to the tongue 6G. Each projection 98 is provided at its end with a pawl 102. The respective pawls 102 of the projections 98 extend in directions away from each other.

The pin 96 is hollow. The proximal ends of the projections 98 are inserted into the pin 96 through a pair of slots 104 formed in a side face of the pin 96. The slots 104 extend in the longitudinal direction of the pin 96. The projections 98 are movable towards and away from each other within the slots 104. A coil spring 106 is built in the pin 96 to bias the projections 98 away from each other. As a result, the projections 98 are normally positioned at the maximum distance away from each other.

The tongue 6G has a tongue plate 8G, and a cover 10G covering the tongue plate 8G. The tongue plate 8G is provided with insertion holes (not shown) into which the projections 98 are inserted so that the pawls 102 are engaged with edges of the insertion holes. The insertion holes are positioned to be superposed with the through holes 100 of the cover 10G.

When connecting the lap belt 4A to the tongue 6G, first the pin 96 is inserted into the hoop portion 76 of the lap belt 4A. Next, the projections 98 are inserted into the through holes 100, respectively. During this step, the pawls 102 come in contact with edges of the through holes 100 to move the projections 98 in the direction towards each other, thereby allowing the pawls 102 to pass through the through holes 100 and the insertion holes (not shown) of the tongue plate 8G. After the pawls 100 pass through the insertion holes, the projections 98 move away from each other by the biasing force of the coil spring 106 so that the projections 98 are engaged with the tongue plate 8G by the pawls 102, thereby connecting the lap belt 4A to the tongue 6G.

As described in the above, the present invention enables a lap belt anchor to be easily coupled to a tongue body. According to the present invention, tongues for inflatable belt devices can be carried to the assembly line of automobiles separately from vehicle interior covers such as pillar covers, the tongue of the inflatable belt device and the vehicle interior cover can be easily assembled as one of processes of assembling the automobile. This can significantly reduce the carrying cost of tongues for inflatable belt devices.

The priority application, Japanese Patent Application No. 2001-206598, filed on Jul. 6, 2001 is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A tongue of an inflatable belt device comprising:
   a tongue body adapted to be latched with a buckle and to which a shoulder belt including an inflatable belt is connected; and
   a lap belt anchor coupled to the tongue body,
   the tongue body including at least one insertion member for engaging the lap belt anchor; and
   a stopper disposed on the tongue body for preventing the lap belt anchor from disengaging with the insertion member first;
   wherein the stopper is configured to move between a first position where the stopper prevents the lap belt anchor from disengaging with the insertion member and a second position where the stopper allows the lap belt anchor to engage with the insertion member.

2. The tongue of claim 1, wherein the stopper is configured to elastically deform as it moves between the first and second positions.

3. The tongue of claim 1, wherein the stopper is biased towards the second position.

4. The tongue of claim 3, further comprising a spring for biasing the stopper.

5. A tongue of an inflatable belt device comprising:
   a tongue body adapted to be latched with a buckle and to which a shoulder belt including an inflatable belt is connected; and
   a lap belt anchor coupled to the tongue body,
   the tongue body including at least one insertion opening for the lap belt anchor; and
   the lap belt anchor including at least one hook to be inserted into the insertion opening and engage with the tongue body;
   wherein the hook is configured to deform when passing through the insertion opening and is configured to return to its original configuration and engage with the tongue body after passing through the insertion opening.

6. A tongue of an inflatable belt device comprising:
   a tongue body adapted to be latched with a buckle and to which a shoulder belt including an inflatable belt is connected;

a lap belt through hole formed in the tongue body;

a lap belt having a front end portion that passes through the lap belt through hole, wherein the lap belt front end portion includes a hoop portion; and a bar member inserted into the hoop portion, the bar member engaging the tongue body to connect the lap belt to the tongue body.

7. The tongue of claim 6, wherein the bar member is configured to be elastically deformed so that the bar member can deform to pass through the lap belt through hole, and can return to an original position after passing through the lap belt through hole.

8. The tongue of claim 6, wherein the bar member engages sides of the lap belt through hole.

9. The tongue of claim 6, wherein the bar member engages a surface of the tongue body on an opposite side of the tongue body from a side from which the lap belt extends away from the tongue.

\* \* \* \* \*